United States Patent [19]

Frey

[11] 4,422,368

[45] Dec. 27, 1983

[54] CYLINDER-PISTON ARRANGEMENT

[75] Inventor: Bernhard Frey, Schaffhausen, Switzerland

[73] Assignee: Hydrowatt Systems Limited, Great Britain

[21] Appl. No.: 439,906

[22] Filed: Nov. 8, 1982

Related U.S. Application Data

[63] Continuation of Ser. No. 138,698, Apr. 9, 1980, abandoned.

[30] Foreign Application Priority Data

Apr. 11, 1979 [DE] Fed. Rep. of Germany ....... 2914695

[51] Int. Cl.$^3$ ............................................. F01B 19/00
[52] U.S. Cl. ...................................... 92/105; 92/86.5; 92/153
[58] Field of Search ................. 92/86.5, 105, 153, 156

[56] References Cited

U.S. PATENT DOCUMENTS

| | | | |
|---|---|---|---|
| 2,027,979 | 1/1936 | Hopkins | 92/153 |
| 2,191,861 | 2/1940 | Rymal | 92/153 |
| 3,212,447 | 10/1965 | Browne | 92/48 |
| 3,902,404 | 9/1975 | Breit | 92/86 |

FOREIGN PATENT DOCUMENTS 1040065 10/1978 Canada .
2554733 6/1976 Fed. Rep. of Germany .

Primary Examiner—Abraham Hershkovitz
Attorney, Agent, or Firm—Yount & Tarolli

[57] ABSTRACT

A relatively movable piston and cylinder are joined by an elastic sealing element which engages the piston and cylinder at spaced locations and at least partially defines a working chamber. The sealing element bears against a bearing surface via a lubricant space, and means are provided for feeding lubricant between the bearing surface and the sealing element. Part of the bearing surface comprises a transition surface section extending oblique to the axis of the cylinder. The lubricant feed mouth opens to the bearing surface at a predetermined location relative to the transition surface section of the bearing surface.

1 Claims, 4 Drawing Figures

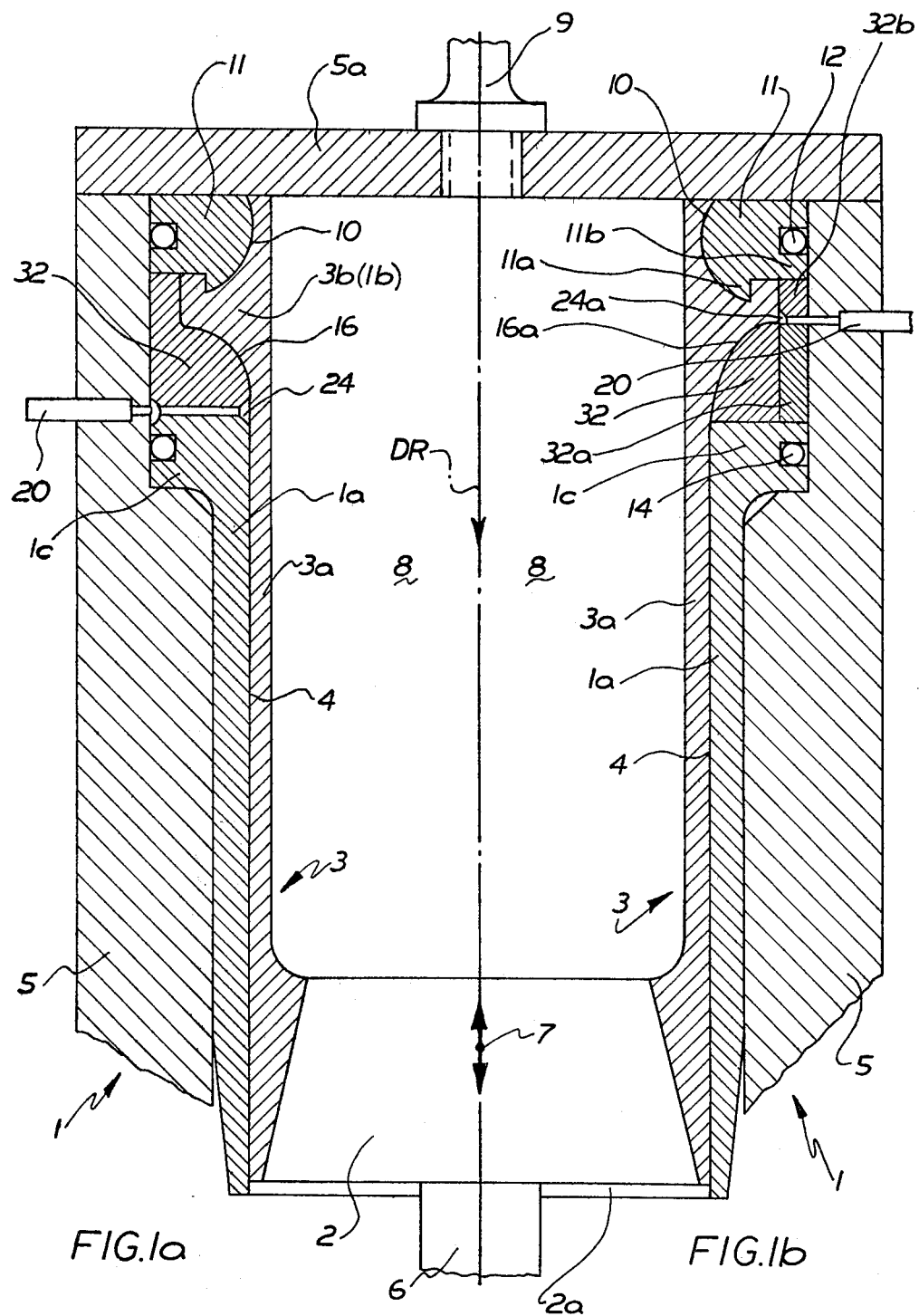

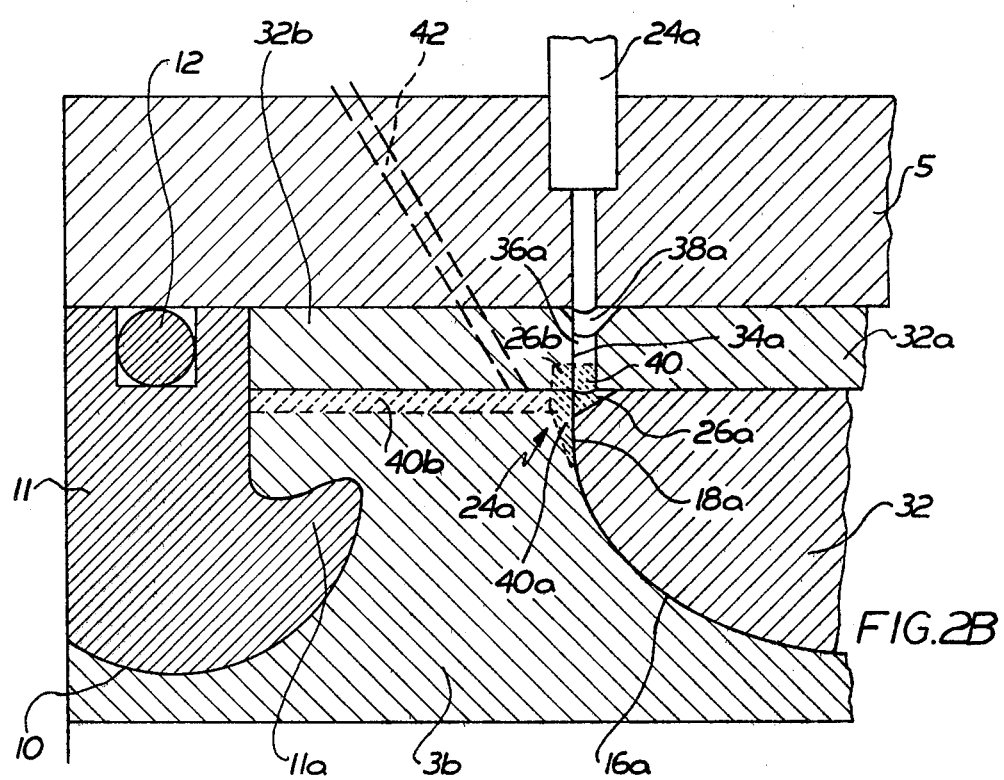
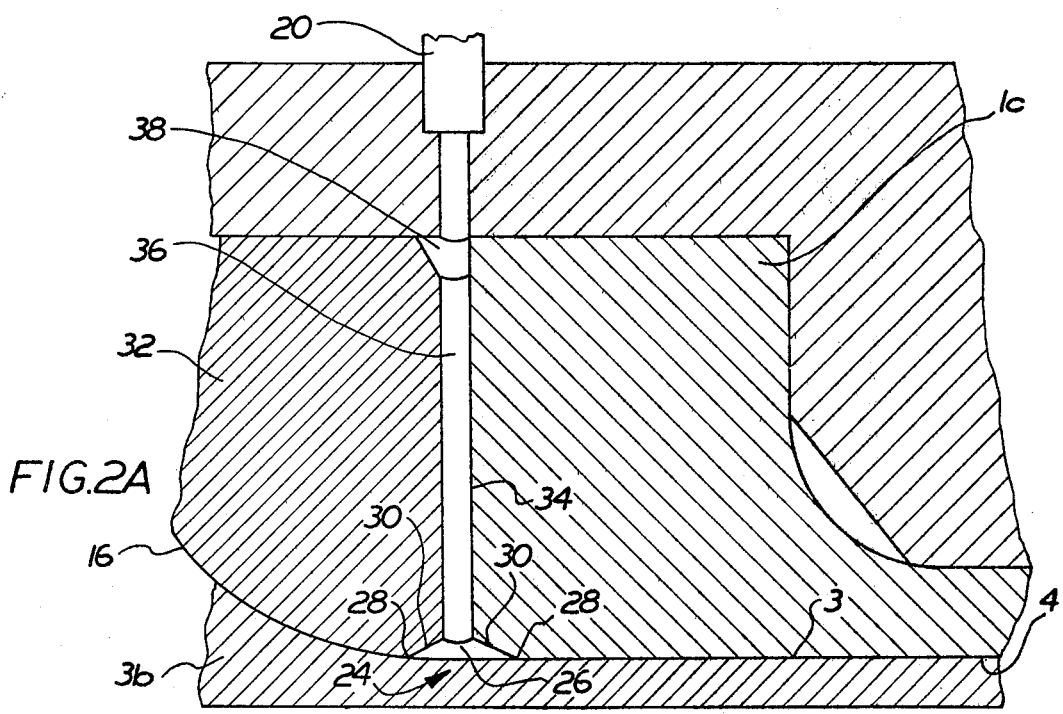

CYLINDER-PISTON ARRANGEMENT

This is a continuation, of application Ser. No. 138,698, filed Apr. 9, 1980, now abandoned.

The invention refers to a cylinder-piston arrangement comprising at least two working members defining a working space, at least one of which exhibits a connection for an easily deformable bellows-like, in particular tubular sealing element as well as if necessary a lubricant feed.

A cylinder-piston arrangement of the above-mentioned kind is known from the West German O/S 25 54 733. In the case of such an arrangement the sealing element in the connection region of the perspective working member, i.e., close to a clamping point, is subjected to strongly non-uniform stresses as well in the case of oscillating stretching to a comparatively powerful friction and notch loading at the surface next to the working member. This holds particularly in respect of high working pressures under which the sealing element rests against the working member unless direct contact or mixed friction is prevented by a corresponding lubricant pressure. But in particular in the case of pulsating or intermittent working pressure such contact or mixed friction between the sealing element and the working member in the connection region can often not be excluded. This means the danger of damage and destruction of the sealing element in the case of fairly long service.

The object of the invention is therefore the creation of a cylinder-piston arrangement which is distinguished by comparatively low loading of the sealing element in the connection region of the working member connected to it.

A first solution of this problem, in accordance with the invention, is characterized by the combination of the features specified in claim 1. The lubricant feed provided in accordance therewith in the region of a transition section of surface of the working member in question, which is inclined or curved or respectively arched with respect to the bearing surface, favours the maintenance of a lubricant pressure which is adequate for keeping a safe distance between the sealing element and the working member and thereby reduces the mechanical loadings engaged at the surface of the sealing element in this critical region. This relief of loading is particularly effective in the case of a lubricant feed which in accordance with a further development of the invention is arranged in the connection region between a toroidal transition section of surface and the generally cylindrical bearing surface. The transverse deformations of the surface of the seal in the case of possible contact with the unevennesses of the mouth from the lubricant feed then lie, that is to say, on the one hand in the region of comparatively low alternate stretching of the material of the seal, that is, close to the point of clamping, but on the other hand not directly in the region of curvature of the transition section of surface where tensile stresses in the material of the seal in parallel with the surface would have to lead to increased pressure against the unevennesses of the mouth.

A second solution of the present problem, in accordance with the invention, is characterized by the combination of the features specified in claim 5. The formation provided for in accordance therewith, of the inclined or curved or respectively arched transition section of surface on the working member in question, by an annular body separated from the latter, offers the considerable advantage that the profiling and machining of the toroidal face with its special requirements may be performed independently of those of the generally cylindrical bearing surface and therefore a greater accuracy of shape and surface finish in the region which is critical for the loading of the seal can be achieved with comparatively low outlay. This holds above all for the transition region between the cylindrical face and the toroidal face which is a difficult one as regards the profiling.

This second solution of the problem of the invention depends upon the same principle as the first to the extent that in both cases reduced friction and in particular notch effect in the connection region of the sealing element and above all in the critical transition region between the generally cylindrical bearing surface and the regions of the surfaces which are angled or curved with respect to it, is being striven for. The natural affinity of the two solutions finds its expression also in a combined application of their features, which is possible with particular advantages, as is characterized in claim 6. The construction provided for in accordance therewith, of the mouth from the lubricant feed with channels in the form of grooves inside one endface of the annular body or an adjoining part of the working member enables with low outlay upon machining an adaptable profiling of the mouth channels, which is an optimum as regards uniform lubricant feed, in combination with a position of the mouth which is favourable for the loading on the seal.

Another further development of the invention provides that the lubricant feed is arranged in the region of a part of the transition section of surface, which is orientated in the direction opposite to that of the stretch of the sealing element, and inside a recess formed by this section of surface in the associated working member, that is, preferably in the region of a reentrant edge of such a recess in the working body. In this region not only do the lowest stresses occur within the easily deformable sealing body, but on the contrary with suitable profiling in general even only very low tensile stresses occur in the surface region. This means comparatively great insensitivity to contact with unevennesses of the surface of the solid body lying opposite as well as to surface damage possibly arising.

Another further development of the invention provides that at least one part of the thickened connection section of the sealing element is under compressive prestress at an angle, preferably transversely to the direction of stretch of the sealing element, between solid connection elements. This measure serves as the solution of the same problem of the invention, that is, the reduction in the loading on the seal in the connection region, and depends upon the same solution principle to the extent that through the compressive prestress the notch effect in the region of the here unavoidably severely non-uniform distribution of stress, which brings a risk of possible damage to the surface of the seal, is reduced. Moreover the possibility exists here too of combination with the remaining inventive measures with special advantages. Such a combination offers in particular in the case of arrangement of the mouth from the lubricant feed in the region of a reentrant edge of a recess in a working member, because by this means tensile stresses in the region of the edges of the mouth are likewise reduced in addition. Furthermore in the case of such an arrangement of the mouth the construction of the mouth channels as grooves in endfaces of corresponding annular bodies again comes into consideration. A spacer ring of that kind at the rear of the toroidal transition section of surface may be employed particularly simply for the generation of a radial compressive prestress in the material of the seal, in which case an annular body of smaller diameter, connected likewise with the working member in question, is provided as abutment and a likewise annular section of the sealing element is inserted into the radial gap between the two annular bodies with compressive prestress.

Further features and advantages of the invention are explained by the embodiments illustrated diagrammatically in the drawings. In these there is shown in:

FIG. 1a—as illustration of the lefthand half of a cylinder-piston arrangement in accordance with the invention, a lubricant feed mouth in the region between the bearing surface and a toroidal transition section of surface;

FIG. 1b—as illustration of the righthand half of a cylinder-piston arrangement in accordance with the invention with the mouth from the lubricant feed in the region of a reentrant edge of a recess in a working member;

FIG. 2a—on a larger scale a partial axial section through the connection region of a sealing element having a lubricant feed corresponding with FIG. 1a; and FIG. 2b—a partial axial section corresponding with FIG. 2a, but for the execution according to FIG. 1b.

Common to the executions as FIGS. 1a and 1b is a first working member made as a cylinder 1 as well as a second working member made as a piston 2 which is driven to oscillate in the sense of the double arrow 7 in a manner not shown via a piston rod 6 or the like. In doing so a flexible sealing element consisting, for example, of suitable rubber made as a sealing tube 3, which at its upper end is connected to the cylinder 1 and at its lower end to the piston 2, forms a working space 8 which pulsates in accordance with the oscillating motion of the piston. The cylindrical part 3a of the sealing tube moreover is subjected, depending upon the approach of the piston 2 to its lower end position, to a more or less vigorous stretching in the direction of the arrow DR. For the rest the sealing tube 3 under the pressure in the working space 8 bears against a bearing surface 4 which is formed by the inner part 1a of the cylinder, that is, via a lubricant, preferably a liquid lubricant which lies in a clearance volume of small thickness between the outer face of the sealing tube 3 and the bearing surface 4. This lubricant is introduced into the clearance volume in a way still to be explained and continuously, but in any case during the upwards directed pressure stroke of the piston 2, flows away throttled at the bottom end of the clearance volume into a space 2a at low pressure. With suitable construction and dimensioning of the arrangement an equilibrium is formed between the working pressure and the lubricant pressure in the clearance volume between the sealing tube and the bearing surface, so that no direct contact or mixed friction occurs against the comparatively sensitive flexible material of the seal. The inner part 1a of the cylinder is inserted in a bore in an outer part 5 of the cylinder, which is closed off at the top by a bolted cover 5a having a feed and discharge pipe 9. For a way of working of the arrangement as a pump for a liquid working medium, the latter is connected to ordinary inlet and outlet valves (not shown) or respectively to a non-return valve arrangement of the usual kind.

The connection of the sealing tube to the cylinder 1 is produced by a connection region 3b of the tube which is thickened in cross-section and which engages radially outwards in a corresponding recess 1b in the cylinder and is fastened by, for example, a vulcanized connection 10 to a connection ring 11 rounded in cross-section and of toroidal shape. The latter is likewise accommodated in the cylindrical recess 1b and sealed against the circumferential face of it by means, for example, of an O-ring 12. Correspondingly the cylinder 1 is sealed at a radially thickened section 1c by means of an O-ring 14 against the inner face of the cylindrical recess.

Again for both executions in common a lubricant feed 20 is provided, introduced radially into the outer part 5 of the cylinder, of which in the example only the connection end of a feed pipe next the cylinder is indicated. For the supply of this lubricant feed an ordinary pump arrangement comes into consideration, which works continuously or else intermittently and generates an adequate feed pressure. Ordinary pump arrangements come into consideration here, which need no explanation and illustration in greater detail. If necessary the lubricant feed may be provided with a non-return valve arrangement ordinary in itself and not shown, which comes into consideration in particular for an intermittent lubricant feed.

In the case of the execution as in FIGS. 1a and 2a the cylindrical bearing surface 4 continues in the upper connection region of the sealing tube into a surface section 16 convexly curved in profile and thus as a whole toroidal, which forms one part of the surface of the cylindrical recess 3b and against which the thickened wall section 3b of the sealing tube bears in the connection region. Because the stretching of the tube in accordance with the arrow DR—although diminished—continues in this thickened wall section, an oscillating friction of the material of the seal occurs at the section 16 of the surface, that is, because of the deflection of the surface of the seal outwards under tensile stress, i.e., under pressure increased beyond the working pressure. The continuous curvature of the profile of the section 16 of surface takes care here of favourable sliding conditions which look after the material, in particular in the case of the employment of a material on the cylinder side which promotes sliding and with correspondingly fine surface machining. But fundamentally other shapes of profile come into consideration too, for example, a combination of curved and straight line sections of profile sloping towards the generatrix of the bearing surface 4 or—say, in the case of light loading—essentially only a straight line sloping shape of profile, i.e., an essentially conical transition section of surface.

It is particularly advantageous that the formation of the section of surface 16 is by an annular body 32 separate from the inner part of the cylinder or respectively from its radially thickened part 1c and having an essentially flat lower endface 34 for contact with the cylindrical part 1c. Because of this separation the section of surface 16 may be machined comparatively simply with the necessary fineness and be produced independently of the rest of the cylinder material from slide-promoting material, in particular, say, even from slide-promoting low-friction plastics such as tetrafluoropolyethylene which also exhibits for many applications adequate compressive strength.

In the case of the execution as in FIGS. 1a and 2a a mouth 24 from the lubricant feed 20 is arranged in the connection region between the section of surface 16 and the cylindrical bearing surface 4. This has not only the advantages already indicated in the introduction as regards the lubrication and bearing of the sealing element, but in particular enables also simple production and favourable profiling of the mouth 24 as well as of a system of distributor channels running radially and in the circumferential direction for a uniformly distributed lubricant feed. Such a radial channel 36 as well as an outer circumferential channel 38 are indicated in FIG. 2a. The mouth 24 itself too is made in the form of a distributor groove 26, that is, having sidefaces 30 which are inclined at an acute angle with respect to the direction of the generatrix of the bearing surface 4 and which on one side are formed by simple bevelling of the end edge of the bearing surface 4 and on the other side by a corresponding bevelling of the annular body 32. The advantageous rounding-off of the circumferential edge 28 of the distributor groove 26 at the mouth can also be particularly easily performed in the case of this separate execution. This rounding-off and the acute-angled arrangement of the sidefaces 30 of the groove look after a low surface loading of the surface of the tube in its oscillating sliding in this critical region.

In the case of the execution as in FIGS. 1b and 2b the mouth 24a from the lubricant feed 20 is arranged likewise in the region of a toroidal steadily curved transition section of surface 16a, but at the upper end of this region, that is, at a part 18a of this section of surface which is orientated in the direction opposite to that of the stretching DR of the sealing tube. This part face 18a is made in the example as a radial flat endface, but if necessary a construction of the profile of the face which is inclined with respect to the axis of the cylinder, i.e., an arrangement of the mouth at a tapered section of surface also advantageously comes into consideration. For the steadiest possible introduction at the lowest possible curvature of the flow of lubricant into the clearance volume between the sealing tube and the bearing surface this may be advantageous, in particular in combination with a tangential direction of discharge as is indicated also in the example, though here with radial entry in the region of the section of surface 16a.

Here too again an annular body 32 separate from the cylindrical part 1a is provided for the formation of the section of surface 16a with the already mentioned advantages as regards surface machining. However, a onepiece execution rather comes into consideration here too, because the radial lubricant feed in the region between the bearing surface 4 and the section of surface 16a with the corresponding channels is omitted.

As shown in detail in FIG. 2b the radially outer part of the annular body 32 is made as a separate spacer ring 32a and is braced in the axial direction between the thickened part 1c of the inner part of the cylinder 1 on one side and the annular body 11 on the other side via a further spacer ring 32b. The dividing up into a number of annular bodies offers here too the advantage that the mouth 24a may be made by a simple bevelling 26a of the edge of the annular body 32 or (indicated in dotted line) as an annular groove 26b in the spacer ring 32b. The same holds for radial distributor grooves 36a and an outer circumferential distributor groove 38a which can be produced by simple profiling of the endface 34a of the spacer ring 32a.

This arrangement of the mouth 34a from the lubricant feed in the region of a reentrant circumferential edge of the recess 1b in the cylinder 1 offers in particular in the case of high working pressures the advantage that forcing inwards (socalled "extruding out") of the flexible material of the seal into the mouth opening is largely excluded by the angular bearing of the material of the seal. In addition this destructive deformation may be opposed by the insertion of porous bearing parts in the mouth from the lubricant feed, which are adequately permeable to the liquid lubricant. For this purpose, e.g., fine-mesh metal guaze, preferably steel gauze comes into consideration. Such a bearing part 40 is indicated in FIG. 2b inside the mouth 24a. Instead of this or also in addition a bearing part may be inserted in the material of the seal in the region of the mouth, for example, in the form of a bearing part 40a extending radially or a bearing part 40b extending axially against the outer face of the material of the seal. The latter execution for the rest makes possible also another kind of lubricant feed, for example, having a radial feed channel or—as indicated in dotted line—one 42 inclined with respect to the cylinder outer face of the connection section 3b of the sealing tube.

In the case of a solid connection of a bearing part onto the flexible material of the seal, in particular one of the substance of the material, a corresponding deformability of the bearing material confers the advantage of a less non-uniform deformation of the material of the seal. Troublesome concentrations of stress in the material of the seal in the case of this deformation are thereby avoided. But fundamentally essentially rigid bearing parts may also be applied which are inserted resiliently in the material of the seal or are arranged at a surface of the sealing element and can shift with the deformation of the material of the seal. Such a bearing part may in particular comprise one more or less rigid section and one resilient section, the latter taking part in the deformation of the material of the seal. A bearing part may, for example, be provided which exhibits two sections corresponding with the parts 40a and 40b, where the thinner section 40a normal to the surface of the material of the seal can yield with it to the pressure of the lubricant at the mouth 24a and release the entry of the lubricant into the clearance volume between the surface of the seal and the transition section of surface 16a or respectively the bearing surface 4.

In the case of the lubricant feed as in FIG. 2b it may be important to exclude access of liquid lubricant into the region of the connection between the material of the seal and the cylinder, thus here in the region of the vulcanized connection 10, by special measures. For doing this a cylinder-like extension part 3c to the rear of the thickened connection section 3b of the sealing tube is braced radially under pressure between the undercut shoulder 11a, rounded off in profile, on the annular body 11 on one side and the spacer ring 32b on the other side. This bracing also contributes to secure fastening of the sealing tube.

I claim:

1. An apparatus comprising a piston and a cylinder, said piston being in part located in said cylinder and said piston and said cylinder being relatively movable, an elastic sealing element sealingly engaging said piston and said cylinder at spaced locations and at least partially defining a working chamber, said sealing element having a surface portion bearing against a bearing surface via a lubricant space, a first part of said bearing surface comprising a transition surface section extending oblique to the axis of said cylinder and a second part of said bearing surface comprising a cylindrical surface parallel to the axis of said cylinder, said sealing element having a radially thickened section mounted on a part of said transition surface section, and means for feeding lubricant between said oblique transition surface section and said sealing element, said means comprising a lubricant feed mouth located immediately adjacent a part of said transition surface section which is aligned approximately normal to the axis of said cylinder and radially outwardly from said cylindrical surface and opening radially inwardly, said transition surface section at least partially comprising a surface of a separate annular body, the apparatus further comprising an annular spacer ring located radially outward of said separate annular body and in facing relation thereto, said lubricant feed mouth comprising an annular recess formed in said annular spacer ring or in said transition surface section.

2. Apparatus as defined in claim 1, wherein said transition surface section comprises a continuously curved surface, and wherein said lubricant feed mouth opens into said lubricant space tangentially to said curved surface.

3. Apparatus as defined in claim 1, wherein said transition surface section comprises at least one re-entrant edge, and wherein said lubricant feed mouth is immediately adjacent said re-entrant edge.

4. An apparatus comprising a piston and a cylinder, said piston being in part located in said cylinder and said piston and said cylinder being relatively movable, an elastic sealing element sealingly engaging said piston and said cylinder at spaced locations and at least partially defining a working chamber, said sealing element having a surface portion bearing against a bearing surface via a lubricant space, a first part of said bearing surface comprising a transition surface section extending oblique to the axis of said cylinder and a second part of said bearing surface comprising a cylindrical surface parallel to the axis of said cylinder, said sealing element having a radially thickened section mounted on a part of said transition surface section, and means for feeding lubricant between said oblique transition surface section and said sealing element, said means comprising a lubricant feed mouth located immediately adjacent a part of said transition surface section extending obliquely to the axis of said cylinder, said lubricant feed mouth being located radially outwardly from said cylindrical surface and opening radially inwardly, the apparatus further comprising, in facing relation to said lubricant feed mouth, at least one deformable bearing part which is inset resiliently into said sealing element or which is correspondingly deformable with said sealing element.

5. An apparatus comprising a piston and a cylinder, said piston being in part located in said cylinder and said piston and said cylinder being relatively movable, an elastic sealing element sealingly engaging said piston and said cylinder at spaced locations and at least partially defining a working chamber, said sealing element having a surface portion bearing against a bearing surface via a lubricant space, a first part of said bearing surface comprising a transition surface section extending at least partially oblique to the axis of said cylinder and a second part of said bearing surface comprising a cylindrical surface parallel to the axis of said cylinder, said sealing element having a radially thickened section supported at least by a part of said transition surface section, and means for feeding lubricant between said bearing surface and said sealing element, said feeding means comprising a lubricant feed mouth, the apparatus further comprising an annular spacer ring located radially outward of said sealing element and in facing relation thereto, and wherein said lubricant feed mouth comprises an annular recess formed in said annular spacer ring or in said transition surface section.

6. An apparatus as in claim 5, wherein said transition surface section comprises a continuously curved surface, and wherein said lubricant feed mouth opens into said lubricant space tangentially to said curved surface.

7. An apparatus comprising a piston and a cylinder, said piston being in part located in said cylinder and said piston and said cylinder being relatively movable, an elastic sealing element sealingly engaging said piston and said cylinder at spaced locations and at least partially defining a working chamber, said sealing element having a surface portion bearing against a bearing surface via a lubricant space, a first part of said bearing surface comprising a transition surface section extending at least partially oblique to the axis of said cylinder and a second part of said bearing surface comprising a cylindrical surface parallel to the axis of said cylinder, said sealing element having a radially thickened section supported at least by a part of said transition surface section, and means for feeding lubricant between said bearing surface and said sealing element, said feeding means comprising a lubricant feed mouth, the apparatus further comprising, in facing relation to said lubricant feed mouth, at least one deformable bearing part which is inset resiliently into said sealing element or which is correspondingly deformable with said sealing element.

8. An apparatus as in claim 7, wherein said transition surface section comprises at least one re-entrant edge, and wherein said lubricant feed mouth is immediately adjacent said re-entrant edge.

9. An apparatus comprising a piston and a cylinder, said piston being in part located in said cylinder and said piston and said cylinder being relatively movable, an elastic sealing element sealingly engaging said piston and said cylinder at spaced locations and at least partially defining a working chamber, said sealing element having a surface portion bearing against a bearing surface via a lubricant space, a first part of said bearing surface comprising a transition surface section extending at least partially oblique to the axis of said cylinder and a second part of said bearing surface comprising a cylindrical surface parallel to the axis of said cylinder, said sealing element having a radially thickened section supported at least by a part of said transition surface section, and means for feeding lubricant between said bearing surface and said sealing element, said feeding means comprising a lubricant feed mouth, the apparatus further comprising a separate annular body forming at least a part of said bearing surface, said lubricant feed mouth comprising distributor channel means normal to and/or coaxial with said cylindrical surface, said channel means comprising at least one recess formed in at least one end of said separate annular body.

* * * * *